United States Patent
Gschwind

(10) Patent No.: US 10,394,568 B2
(45) Date of Patent: *Aug. 27, 2019

(54) EXCEPTION HANDLING FOR APPLICATIONS WITH PREFIX INSTRUCTIONS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 14/871,970

(22) Filed: Sep. 30, 2015

(65) Prior Publication Data

US 2017/0090939 A1    Mar. 30, 2017

(51) Int. Cl.
*G06F 9/30* (2018.01)
*G06F 9/32* (2018.01)
(Continued)

(52) U.S. Cl.
CPC ........ *G06F 9/3861* (2013.01); *G06F 9/30167* (2013.01); *G06F 9/30185* (2013.01);
(Continued)

(58) Field of Classification Search
CPC .............. G06F 9/3861; G06F 9/30167; G06F 9/30185; G06F 9/34
See application file for complete search history.

(56) References Cited

U.S. PATENT DOCUMENTS

| 5,303,358 A | 4/1994 | Baum |
| 5,491,808 A | 2/1996 | Geist, Jr. |

(Continued)

FOREIGN PATENT DOCUMENTS

| EP | 1351135 B1 | 12/2010 |
| GB | 2486905 A | 4/2012 |

OTHER PUBLICATIONS

Frazier, Giles R., "Extending Data Range Addressing," U.S. Appl. No. 15/194,666, filed Jun. 28, 2016, pp. 1-58.
(Continued)

*Primary Examiner* — Aimee Li
*Assistant Examiner* — Andrew J Cromer
(74) *Attorney, Agent, or Firm* — Steven Chiu, Esq.; Blanche E. Schiller, Esq.; Heslin Rothenberg Farley & Mesiti P.C.

(57) ABSTRACT

Managing exception handling. A plurality of instruction units of an instruction stream are selected to be decoded in parallel by a plurality of instruction decode units of a processor. The plurality of instruction units includes a prefix instruction and a prefixed instruction. The prefixed instruction is an instruction to be modified by the prefix instruction. An exception condition associated with the prefixed instruction is determined. Exception handling is performed for the prefixed instruction, in which the performing includes determining an address at which to restart execution of the instruction stream. The determining the address includes adjusting the address at which to restart execution based on the prefix instruction to be separately decoded by an instruction decode unit.

20 Claims, 15 Drawing Sheets

(51) Int. Cl.
*G06F 9/34* (2018.01)
*G06F 9/38* (2018.01)

(52) U.S. Cl.
CPC ............... *G06F 9/32* (2013.01); *G06F 9/342* (2013.01); *G06F 9/3822* (2013.01)

(56) References Cited

U.S. PATENT DOCUMENTS

| | | | |
|---|---|---|---|
| 5,537,629 A | 7/1996 | Brown et al. | |
| 5,809,273 A * | 9/1998 | Favor | G06F 9/30152 712/210 |
| 5,822,559 A | 10/1998 | Narayan | |
| 5,867,701 A | 2/1999 | Brown et al. | |
| 6,014,735 A | 1/2000 | Chennupaty et al. | |
| 6,058,464 A | 5/2000 | Taylor | |
| 6,240,506 B1 * | 5/2001 | Miller | G06F 9/30152 712/205 |
| 6,260,134 B1 * | 7/2001 | Zuraski, Jr. | G06F 9/30152 712/204 |
| 6,275,927 B2 * | 8/2001 | Roberts | G06F 9/3016 712/213 |
| 6,336,178 B1 | 1/2002 | Favor | |
| 6,571,330 B1 | 5/2003 | McGrath | |
| 6,970,998 B1 | 11/2005 | Favor | |
| 7,181,596 B2 | 2/2007 | Henry et al. | |
| 7,487,338 B2 | 2/2009 | Matsuo | |
| 9,329,869 B2 | 5/2016 | Gschwind | |
| 2001/0013095 A1 * | 8/2001 | Holmann | G06F 9/30058 712/234 |
| 2003/0135789 A1 * | 7/2003 | DeWitt, Jr. | G06F 11/3466 714/38.13 |
| 2003/0236965 A1 | 12/2003 | Scheaffer | |
| 2005/0033940 A1 | 2/2005 | McGrath | |
| 2007/0260849 A1 | 11/2007 | Chen et al. | |
| 2008/0215856 A1 | 9/2008 | Gschwind | |
| 2008/0282066 A1 | 11/2008 | May | |
| 2009/0019257 A1 * | 1/2009 | Shen | G06F 9/30152 712/23 |
| 2010/0332803 A1 | 12/2010 | Yoshida et al. | |
| 2011/0035745 A1 | 2/2011 | Li et al. | |
| 2012/0331273 A1 | 12/2012 | Smith et al. | |
| 2013/0275723 A1 * | 10/2013 | Combs | G06F 9/3016 712/208 |
| 2014/0095833 A1 * | 4/2014 | Gschwind | G06F 9/30 712/205 |
| 2014/0164741 A1 | 6/2014 | Gschwind et al. | |
| 2015/0347144 A1 * | 12/2015 | Whittaker | G06F 9/30149 712/208 |
| 2017/0090923 A1 | 3/2017 | Gschwind | |
| 2017/0090931 A1 | 3/2017 | Frazier et al. | |
| 2017/0090932 A1 | 3/2017 | Frazier et al. | |
| 2017/0090940 A1 | 3/2017 | Gschwind | |
| 2017/0091064 A1 | 3/2017 | Gschwind | |
| 2017/0091065 A1 | 3/2017 | Gschwind | |
| 2018/0113784 A1 | 4/2018 | Gschwind | |
| 2018/0113785 A1 | 4/2018 | Gschwind | |

OTHER PUBLICATIONS

Gschwind, Michael K., "Debugging of Prefixed Code," U.S. Appl. No. 15/195,800, filed Jun. 28, 2016, pp. 1-52.

List of IBM Patents or Patent Applications Treated as Related dated Oct. 24, 2016, pp. 1-2.

Mel, Peter and Tim Grance, "The NIST Definition of Cloud Computing," National Institute of Standards and Technology, Information Technology Laboratory, Special Publication 800-145, Sep. 2011, pp. 1-7.

"Z/Architecture Principles of Operation," IBM® Publication No. SA22-7832-10, Eleventh Edition, Mar. 2015, pp. 1-1732.

"Power ISA™ Version 2.07B," International Business Machines Corporation, Apr. 9, 2015, pp. 1-1527.

"Intel® 64 and IA-32 Architectures Developer's Manual: vol. 2A, Instructions Set Reference, A-L," Order No. 253666-045US, Jan. 2013, pp. 1-524.

"Intel® 64 and IA-32 Architectures Developer's Manual: vol. 2B, Instructions Set Reference, M-Z," Order No. 253667-045US, Jan. 2013, pp. 1-550.

Binder, Walter et al., "Advanced Java Bytecode Instrumentation," Proceedings of the 5th International Symposium on Principles and Practice of Programming in Java, Sep. 2007, pp. 135-144.

Frazier, Giles R., "Extending Data Range Addressing," U.S. Appl. No. 14/871,959, filed Sep. 30, 2015, pp. 1-62.

Gschwind, Michael K., "Exception Handling for Applications with Prefix Instruction," U.S. Appl. No. 14/941,575, filed Nov. 14, 2015, pp. 1-51.

Gschwind, Michael K., "Managing the Capture of Information in Applications with Prefix Instructions," U.S. Appl. No. 14/871,979, filed Sep. 30, 2015, pp. 1-51.

Gschwind, Michael K., "Debugging of Prefixed Code," U.S. Appl. No. 14/871,985, filed Sep. 30, 2015, pp. 1-55.

List of IBM Patents or Patent Applications Treated as Related dated Mar. 16, 2016, pp. 1-2.

Office Action for U.S. Appl. No. 14/871,985 dated Oct. 5, 2016, pp. 1-26.

Final Office Action for U.S. Appl. No. 14/871,985 dated May 3, 2017, pp. 1-24.

Office Action for U.S. Appl. No. 14/871,959 dated Jun. 1, 2017, pp. 1-32.

Office Action for U.S. Appl. No. 14/871,979 dated Aug. 30, 2017, pp. 1-15.

* cited by examiner

SELECT A PLURALITY OF INSTRUCTION UNITS OF AN INSTRUCTION STREAM TO BE RECEIVED IN PARALLEL BY A PLURALITY OF INSTRUCTION DECODE UNITS OF A PROCESSOR. ~1100

THE PLURALITY OF INSTRUCTION UNITS INCLUDES A PREFIX INSTRUCTION AND A PREFIXED INSTRUCTION. THE PREFIXED INSTRUCTION IS AN INSTRUCTION TO BE MODIFIED BY THE PREFIX INSTRUCTION. ~1102

THE PREFIX INSTRUCTION AND THE PREFIXED INSTRUCTION ARE THE SAME SIZE, AND THE SIZE OF THE INSTRUCTION UNITS IS DEFINED BY THE ISA. ~1104

DETERMINE AN EXCEPTION CONDITION. ~1106

DETERMINE AN INSTRUCTION FAULT BETWEEN PREFIX AND PREFIXED INSTRUCTION. ~1108

DETERMINE EXCEPTION CONDITION DURING EXECUTION OF PREFIXED INSTRUCTION. ~1110

PERFORM EXCEPTION HANDLING. ~1114

DETERMINE AN ADDRESS AT WHICH TO RESTART EXECUTION OF THE INSTRUCTION STREAM, IN WHICH THE DETERMINING THE ADDRESS INCLUDES ADJUSTING THE ADDRESS AT WHICH TO RESTART EXECUTION BASED ON THE PREFIX INSTRUCTION TO BE SEPARATELY RECEIVED BY AN INSTRUCTION DECODE UNIT. ~1116

THE ADJUSTING THE ADDRESS INCLUDES SUBTRACTING A LENGTH OF THE PREFIX INSTRUCTION FROM AN ADDRESS OF THE PREFIXED INSTRUCTION TO OBTAIN AN ADJUSTED ADDRESS AT WHICH TO RESTART EXECUTION. ~1120

AN INDICATION OF THE EXCEPTION CONDITION AND PRESENCE OF THE PREFIX INSTRUCTION ARE PRESENTED. ~1122

THE EXCEPTION CONDITION IS RECOVERED FROM USING A REPORTED ADDRESS OF THE EXCEPTION CONDITION OR A REPORTED ADDRESS OF THE EXCEPTION CONDITION ADJUSTED BY A LENGTH OF THE PREFIX INSTRUCTION. ~1124

EXCEPTION HANDLING FOR APPLICATIONS WITH PREFIX INSTRUCTIONS

BACKGROUND

One or more aspects relate, in general, to processing within a computing environment, and in particular, to exception handling.

Today, system architectures have the capability to handle synchronous exceptions (e.g., page faults) within a set of predefined parameters. For example, a processor may take a page fault, indicate the location of the page fault and restart the instruction. As a particular example, on a System z server based on the z/Architecture offered by International Business Machines Corporation, Armonk, N.Y., the processor can take an itext page fault anywhere within a 6 byte opcode. The location of the page fault is indicated at the beginning of the interrupted instruction. However, with certain types of instructions, such as prefix instructions, the handling of exception conditions may be more complex.

Prefix instructions are used to modify subsequent instructions, and in one example, are used to extend addressability. For instance, different computer system architectures offer data addressing with different displacements providing varying sizes of directly addressable data ranges. As examples, the Power Architecture, offered by International Business Machines Corporation, Armonk, N.Y., provides data addressing with a 16-bit displacement providing a 64 KB (kilobyte) directly addressable data range, while the x86 architecture, offered by Intel Corporation, provides data addressing with a 32-bit displacement providing a 4 GB (gigabyte) directly addressable data range.

The size of the directly addressable data range impacts and limits software applications. For instance, the size of global data areas, such as a Global Offset Table or Table of Contents used by software applications to locate global variables, is limited by the size of the directly addressable data range. As an example, if 16 bits is the maximum size of an immediate offset from a base register, then the size of the directly usable global data area is limited to 64 KB.

SUMMARY

Shortcomings of the prior art are overcome and additional advantages are provided through the provision of a computer program product for managing exception conditions. The computer program product includes a storage medium readable by a processing circuit and storing instructions for execution by the processing circuit for performing a method. The method includes selecting a plurality of instruction units of an instruction stream to be received in parallel by a plurality of instruction decode units of a processor, wherein the plurality of instruction units includes a prefix instruction and a prefixed instruction, the prefixed instruction being an instruction to be modified by the prefix instruction; determining an exception condition associated with the prefixed instruction; and performing exception handling for the prefixed instruction, wherein the performing includes determining an address at which to restart execution of the instruction stream, wherein the determining the address includes adjusting the address at which to restart execution based on the prefix instruction to be separately received by an instruction decode unit.

In one or more aspects, even though the prefix and prefixed instructions are separate instructions initially received by independent decode units, the exception handling takes into consideration both instructions.

In one embodiment, the determining the exception condition includes determining that an instruction fault exists between the prefix instruction and the prefixed instruction to be separately received. In another embodiment, the exception condition occurs during execution of the prefixed instruction.

Further, in one embodiment, the adjusting the address includes subtracting a length of the prefix instruction from an address of the prefixed instruction to obtain an adjusted address at which to restart execution. This allows the restart to occur at the proper address.

The performing the exception handling includes, in one example, presenting an indication of the exception condition and presence of the prefix instruction. Further, in one embodiment, the performing the exception handling includes recovering from the exception condition using one of a reported address of the exception condition or a reported address of the exception condition adjusted by a length of the prefix instruction.

In a further aspect, a determination is made as to whether a last instruction decode unit of the plurality of instruction decode units is to receive the prefix instruction. Based on determining that the last instruction decode unit is to receive the prefix instruction, forwarding of the prefix instruction to an instruction decode unit is delayed until both the prefix instruction and the prefixed instruction are to be received in parallel. This allows efficient processing of the prefix and prefixed instructions.

The delaying forwarding includes, for instance, saving the prefix instruction for later processing; and including the prefix instruction in a next group of a plurality of instruction units to be processed.

As examples, the prefix instruction is the same size as the prefixed instruction, and the size of an instruction unit is defined by an instruction set architecture of an architecture of the processor.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 11A-11B depict one example of logic to manage exception conditions, in accordance with an aspect of the present invention;

DETAILED DESCRIPTION

In accordance with an aspect of the present invention, an exception handling facility is provided that is used to handle exception conditions in code that includes prefix instructions. A prefix instruction is used, for instance, to extend addressability of instructions, and therefore, addressing of directly addressable data ranges. In one embodiment, the prefix instruction is used to override (i.e., ignore) one or more fields explicitly specified by an instruction (referred to as a prefixed instruction), in which an overridden field specifies an operand or data to be used to obtain an operand; and/or the prefix provides additional bits to be used with one or more immediate fields of the instruction.

Figure 1A:
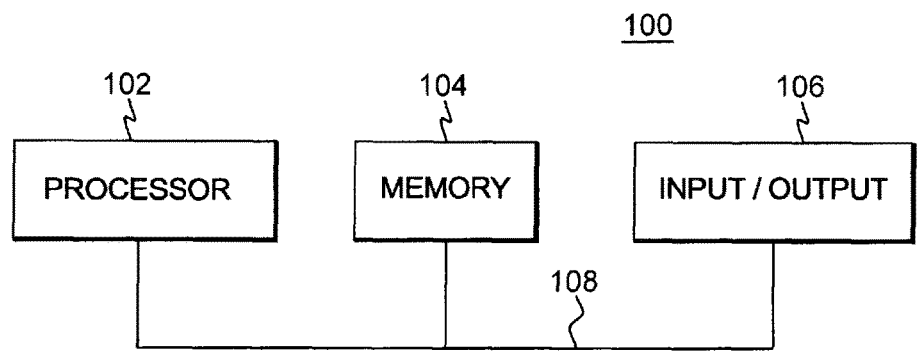
FIG. 1A depicts one example of a computing environment to incorporate and/or use one or more aspects of the present invention.

One embodiment of a computing environment to incorporate and use one or more aspects of the exception handling facility is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-10, Eleventh Edition, March 2015, which is hereby incorporated by reference herein in its entirety. In one example, the processor executes an operating system, such as z/OS, also offered by International Business Machines Corporation. IBM®, Z/ARCHITECTURE® and Z/OS® (as well as Z/VM® referenced below) are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated by reference herein in its entirety. POWER ARCHITECTURE® is a registered trademark of International Business Machines Corporation, Armonk, N.Y.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated by reference herein in its entirety. Intel is a registered trademark of Intel Corporation, Santa Clara, Calif.

Figure 1B:
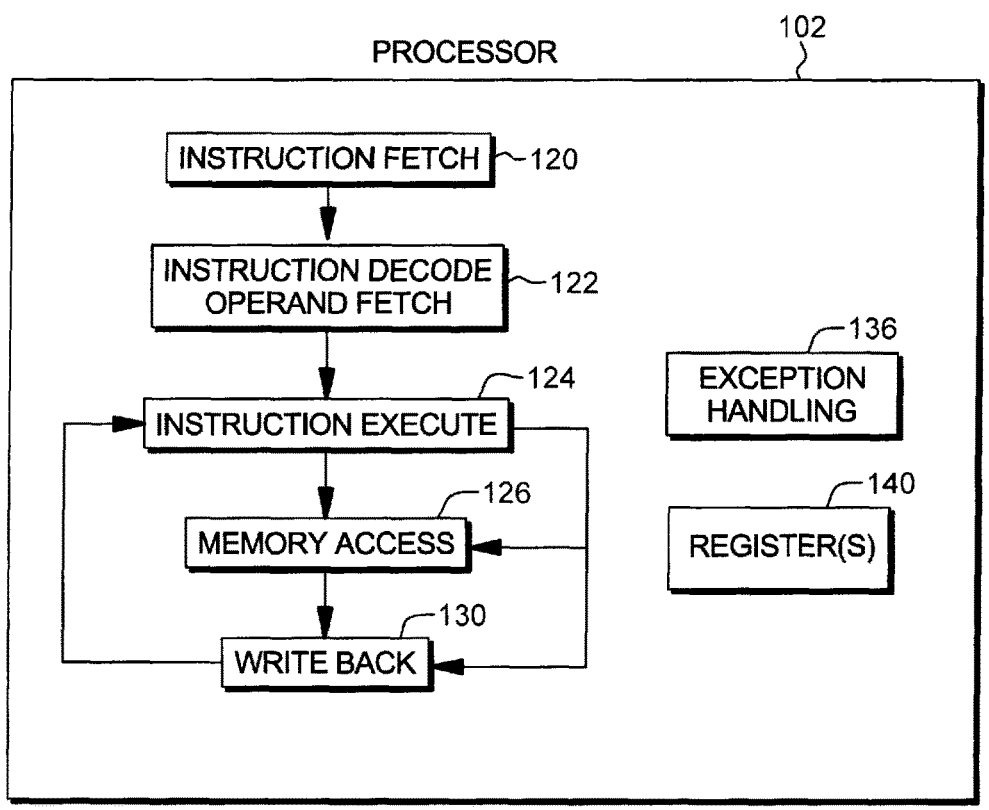
FIG. 1B depicts further details of a processor of the computing environment of FIG. 1A, in accordance with an aspect of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect of the present invention, provide exception handling functionality by including at least a portion of or having access to an exception handling component 136. This functionality is described in further detail below.

Processor 102 also includes, in one embodiment, one or more registers 140 to be used by one or more of the functional components.

Figure 2:
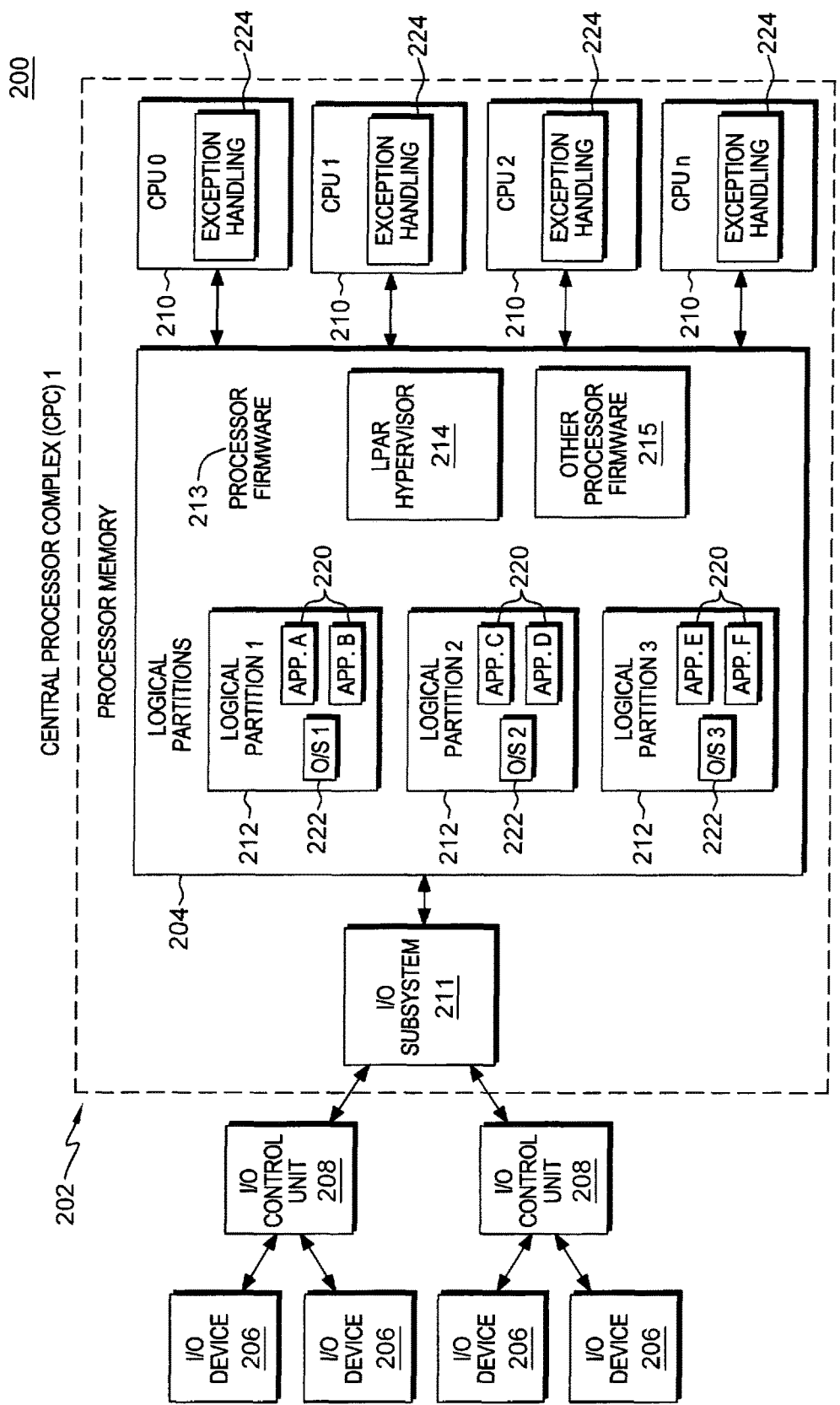
FIG. 2 depicts another embodiment of a computing environment to incorporate and/or use one or more aspects of the present invention.

Another embodiment of a computing environment to incorporate and use one or more aspects of the exception handling facility is described with reference to FIG. 2. In one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition. In one example, one or more of the CPUs include aspects of the exception handling 224 described herein.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communication adapters. There are various types of communication adapters including, for instance, channels, I/O adapters, PCI cards, Ethernet cards, Small Computer Storage Interface (SCSI) cards, etc. In the particular example described herein, the I/O communication adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
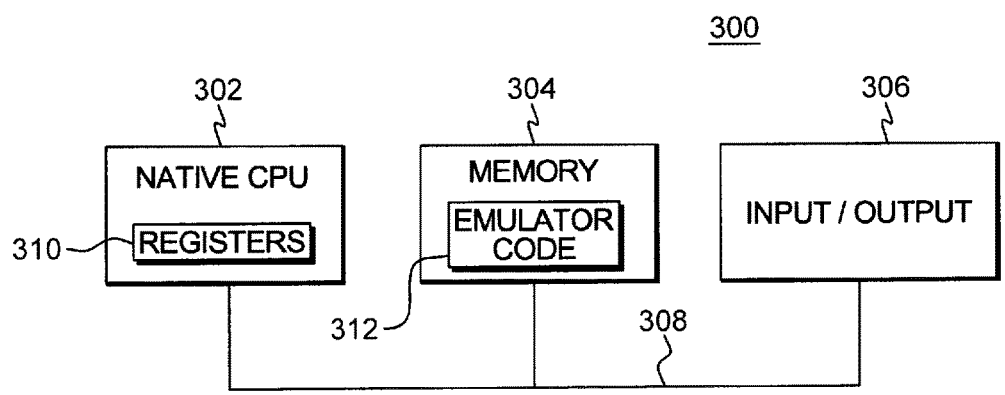
FIG. 3A depicts yet a further embodiment of a computing environment to incorporate and/or use one or more aspects of the present invention.

Another embodiment of a computing environment to incorporate and use one or more aspects of the exception handling facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
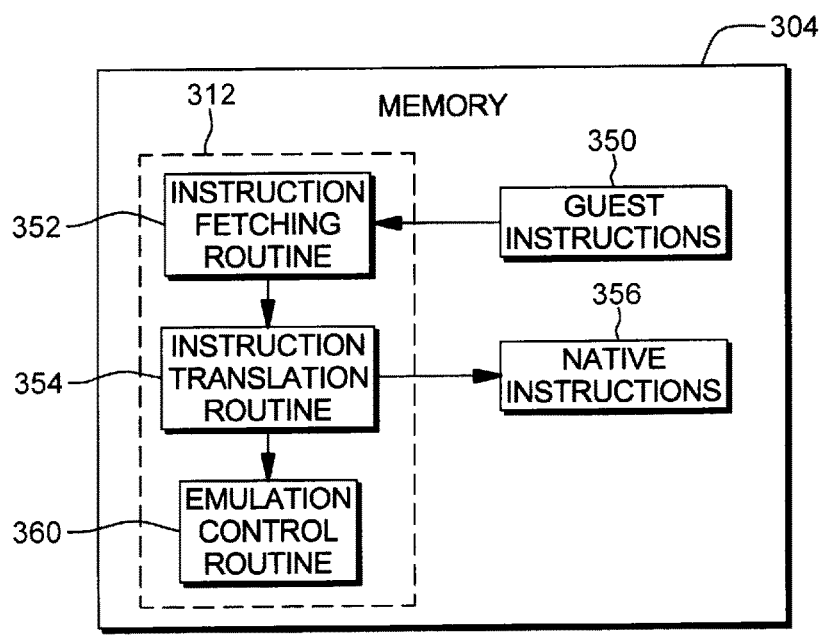
FIG. 3B depicts further details of the memory of the computing environment of FIG. 3A, in accordance with an aspect of the present invention.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention.

For instance, each may be configured to handle exception conditions in applications that include prefix instructions.

Figure 4A:
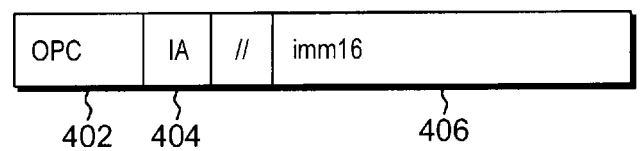
FIGS. 4A-4C depict various examples of a prefix instruction used in accordance with one or more aspects of the present invention.

One example of a prefix instruction is described with reference to FIG. 4A. In one example, a prefix instruction 400A includes, for instance, an operation code (OPC) field 402 including an operation code that specifies a prefix instruction; an instruction address (IA) field 404 including an indicator indicating whether an address based on a successor instruction, such as the current instruction address (e.g., the program counter) of a successor instruction (referred to as a prefixed instruction), is to be used as a base address for the successor instruction, thus overriding one or more operands of the successor instruction; and at least one immediate (imm16) field 406 including a value (e.g., 16 bits) that is to be employed with (e.g., added to) one or more operands of the successor instruction. The instruction address indicator and the value(s) are referred to herein as a prefix. The prefix is specified by the prefix instruction, as one example.

Figure 4B:
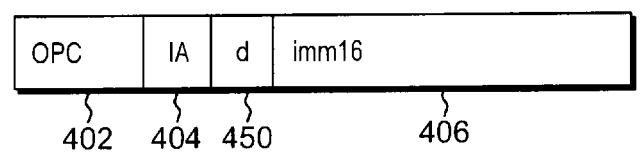
Figure 4C:
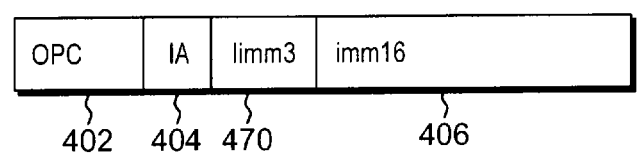

In a further embodiment, as shown in FIG. 4B, a prefix instruction 400B may include a displacement specifier (d) field 450 that indicates whether additional immediate bits are to be used.

In yet a further embodiment, a prefix instruction 400C includes a further immediate (limm3) field 470 including a value (e.g., 3 bits) which may be employed with (e.g., added to, OR'd with) low order bits of an immediate operand of the successor instruction, while the value in immediate field 406 may be employed with high order bits of an immediate operand. Additionally, limm3 may be used to override one or more bits of an immediate operand of the successor instruction. As examples, if an instruction has a DS immediate field (e.g., a Load Floating-Point Double Pair or a Store Floating-Point Double Pair instruction), then the operand of the field may be extended as follows: imm16||DS|| limm3<1:2>; or in another example, imm16||DS<16:28>||limm3<0:2>. Many other possibilities exist. For instance, limm3 may be OR'd, e.g., (DS||0b00) OR limm3<0:2>. Again, other possibilities exist.

In one example, in operation of the prefix instruction (e.g., 400A, 400B, 400C), a special purpose register, referred to herein as SPRd, is updated to include values of the fields of the instruction. For instance, one field of the register (e.g., SPRd[val]) is set equal to the value in immediate field 406. Further, another field of the register (e.g., SPRd[IA]) is set equal to the instruction address indicator included in the prefix instruction (e.g., set to one to indicate that the current instruction address is to be used as a base address in the next instruction). In yet a further embodiment, another field of the register or an existing field (e.g., val) may include the value in immediate field 470. Other possibilities also exist. These values are then used in many types of instructions, including D-form instructions that include displacements, x-form instructions (i.e., index form instructions computing a memory address as the sum of two registers, e.g., RA+RB), etc.

The prefix instruction is used to modify a prefixed instruction. Thus, in accordance with one or more aspects, the prefix instruction and prefixed instruction are forwarded to decode units substantially in parallel.

Figure 5:
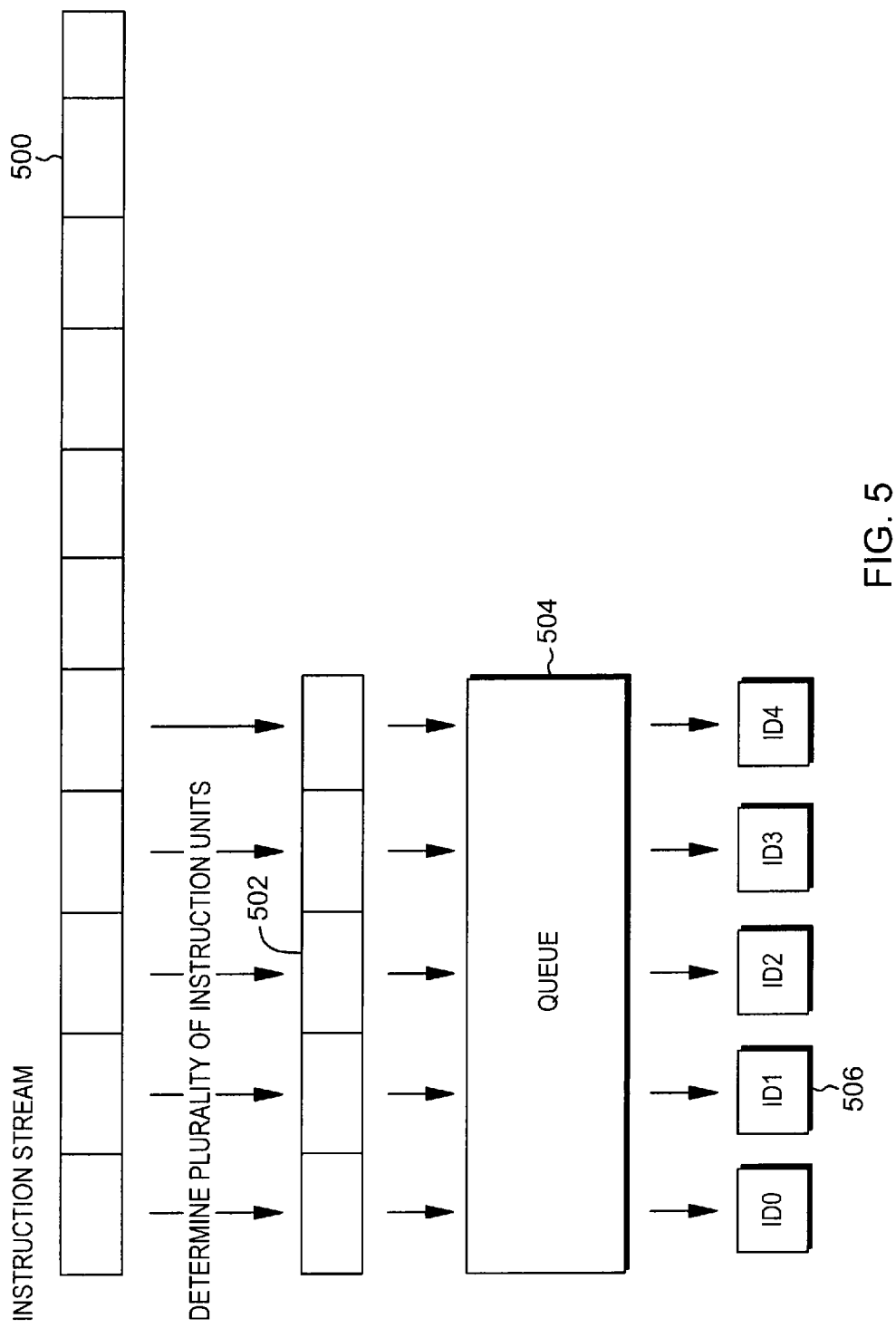
FIG. 5 depicts one example of a plurality of instruction decode units receiving a plurality of instruction units, in accordance with one or more aspects of the present invention.

One example of processing associated with decoding application code that includes prefix instructions is described with reference to FIG. 5. As shown, an instruction stream 500 includes a plurality of instruction units 502. For the Power Architecture, each instruction unit is 4 bytes, and therefore, each instruction unit is the same size. However, in other examples, such as the z/Architecture, the size of the instruction unit is determined by one or more bytes of the instruction. In this particular example, five instruction units are processed in parallel, but in other embodiments, there may be more or less instruction units being processed in parallel. The instruction units are placed in a queue 504 and then passed to instruction decode units 506 (ID; e.g., ID0-ID4); also referred to herein as decoders or decoder units. Each instruction decode unit decodes its instruction unit.

Figure 6:
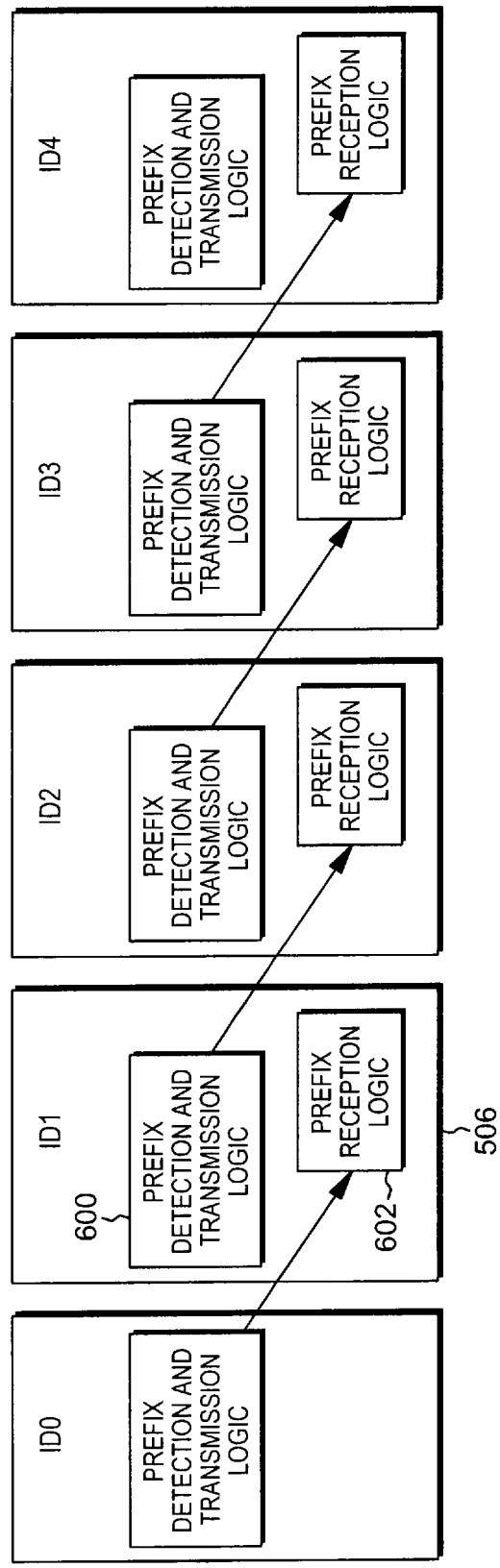
FIG. 6 depicts further details of the instruction decode units of FIG. 5, in accordance with one or more aspects of the present invention.

Further details of an instruction decode unit are described with reference to FIG. 6. In one example, each decoder includes prefix detection and transmission logic 600 and prefix reception logic 602, as well as other logic.

Prefix detection and transmission logic 600 detects if the instruction received by the decoder is a prefix instruction, and if it is, it is forwarded to prefix reception logic 602 of a neighboring instruction decode unit 506. For instance, prefix detection and transmission logic 600 checks the opcode of the instruction and determines that it is a prefix instruction. It then forwards the instruction (or portions thereof) to the next instruction decode unit in succession. As an example, if prefix detection and transmission logic 600 of ID0 detects that the instruction is a prefix instruction, then it forwards the instruction to ID1. Reception logic 602 of ID1 receives the prefix instruction, which is to be used with the instruction received at ID1 by prefix detection and transmission logic 600 of ID1. The prefix instruction and the instruction to be modified by the prefix instruction (i.e., the prefixed instruction) are decoded together.

In one embodiment, a determination of the presence of a prefix may be made by a single instruction decode unit to which the prefix is assigned, thereby initiating the combining of the prefix and the prefixed instruction.

Figure 7:
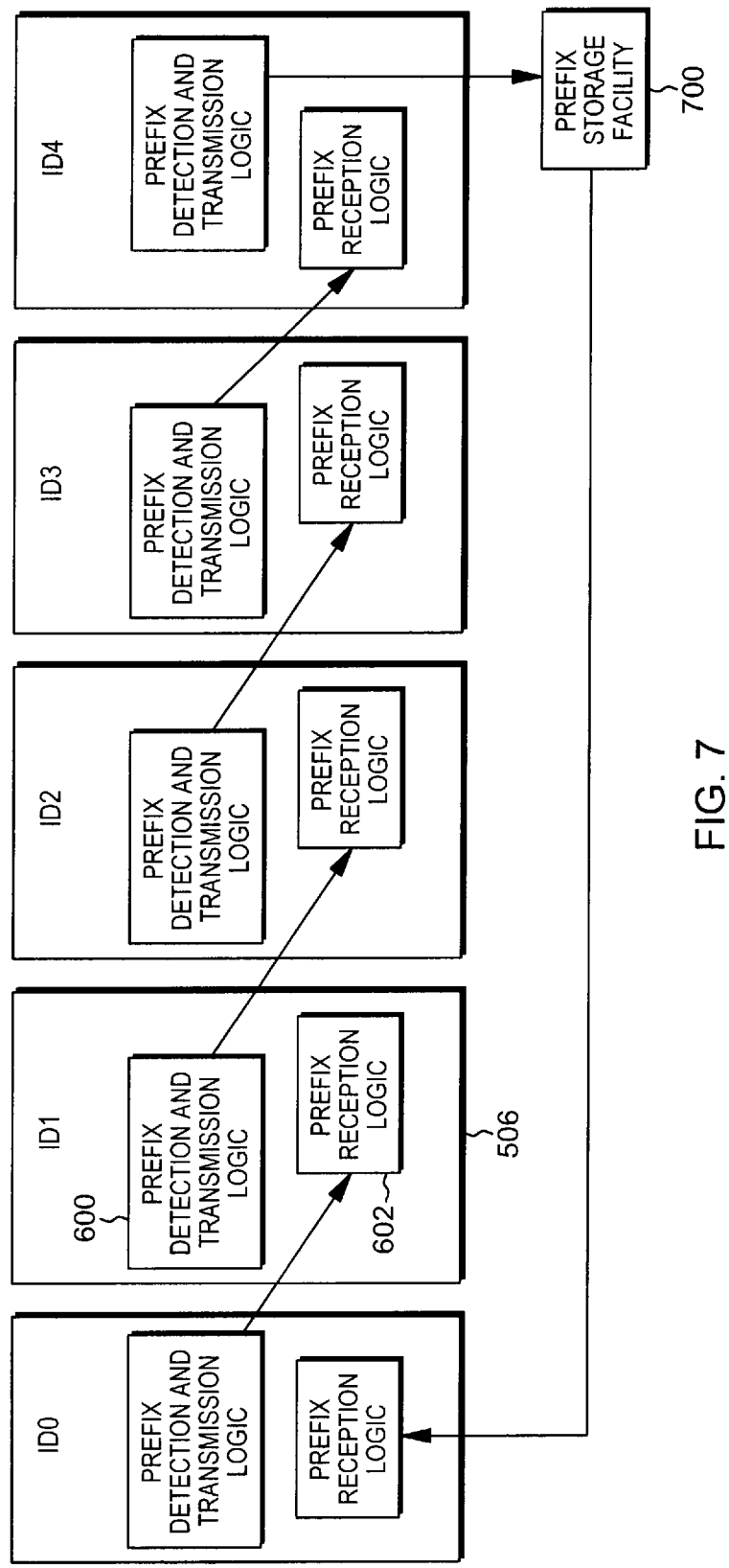
FIG. 7 depicts one example of a prefix storage facility used in accordance with one or more aspects of the present invention.

In a further embodiment, referring to FIG. 7, a prefix storage facility 700 may be provided in the event that the last decoder unit in the group of decoder units includes the prefix instruction. This is to accommodate the fact that the last decoder has no "next" decoder in which to forward the prefix instruction. The prefix instruction is saved in prefix storage facility 700, and then forwarded to the first decoder (ID0) of the next group of instruction units to be decoded. Therefore, the prefix instruction is united with the instruction to be prefixed, and they are decoded together. In one embodiment in which there are multithreaded processors, i.e., processors with hardware multithreading or simultaneous multithreading, multiple prefix storage facilities 700 may be present, one for each thread.

Figure 8:
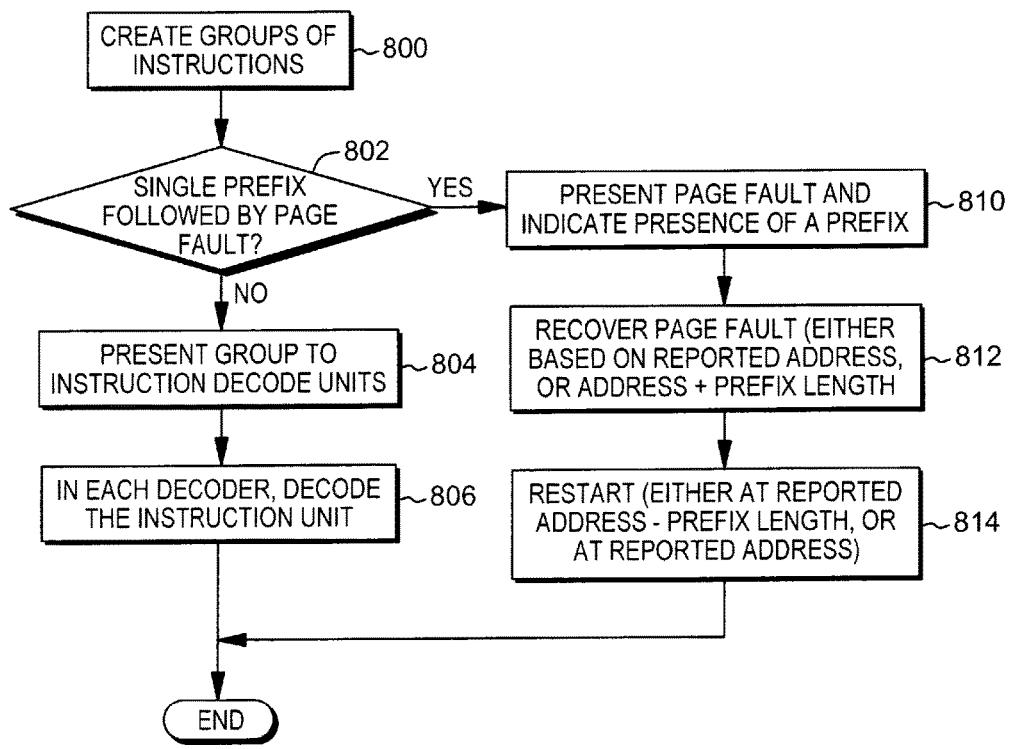
FIG. 8 depicts one embodiment of decoding and exception logic used in accordance with one or more aspects of the present invention.

During the decode phase, an exception condition, such as a page fault, may occur. One embodiment of logic to manage such a situation, in accordance with an aspect of the present invention, is described with reference to FIG. 8. Initially, a group of instructions is created for decoding, STEP 800. For instance, a plurality of instruction units (e.g., 5 instruction units) is selected for forwarding to a plurality of decoders in parallel.

A determination is made as to whether a prefix instruction is included in the group (e.g., by checking the opcodes of the instructions), and if there is a prefix instruction, a further check is made as to whether it is at the end of a page (e.g., based on addressing), in which the next instruction would encounter a page fault, INQUIRY 802.

If there is no prefix instruction with a page fault condition, then the group of instruction units is forwarded to the instruction decode units in parallel, STEP 804. Each decoder decodes its instruction unit, as described herein, STEP 806.

Returning to INQUIRY 802, if it is determined that there is a prefix instruction and a page fault condition, then the page fault is presented, along with an indication of the presence of a prefix, STEP 810. Control passes to a software handler to recover from a page fault. In one embodiment, the address of the page fault is reported. In another embodiment, the address of the prefix instruction is reported.

Additionally, the page fault is recovered by the software handle, either based on a reported address or the address plus the length of the prefix, STEP 812. Further, the instruction is restarted, either at the reported address minus the prefix length or at the reported address, STEP 814. Thus, even though the prefix instruction and prefixed instruction are separate instructions independently received by decode units, both instructions are considered in handling exception conditions.

Figure 9:
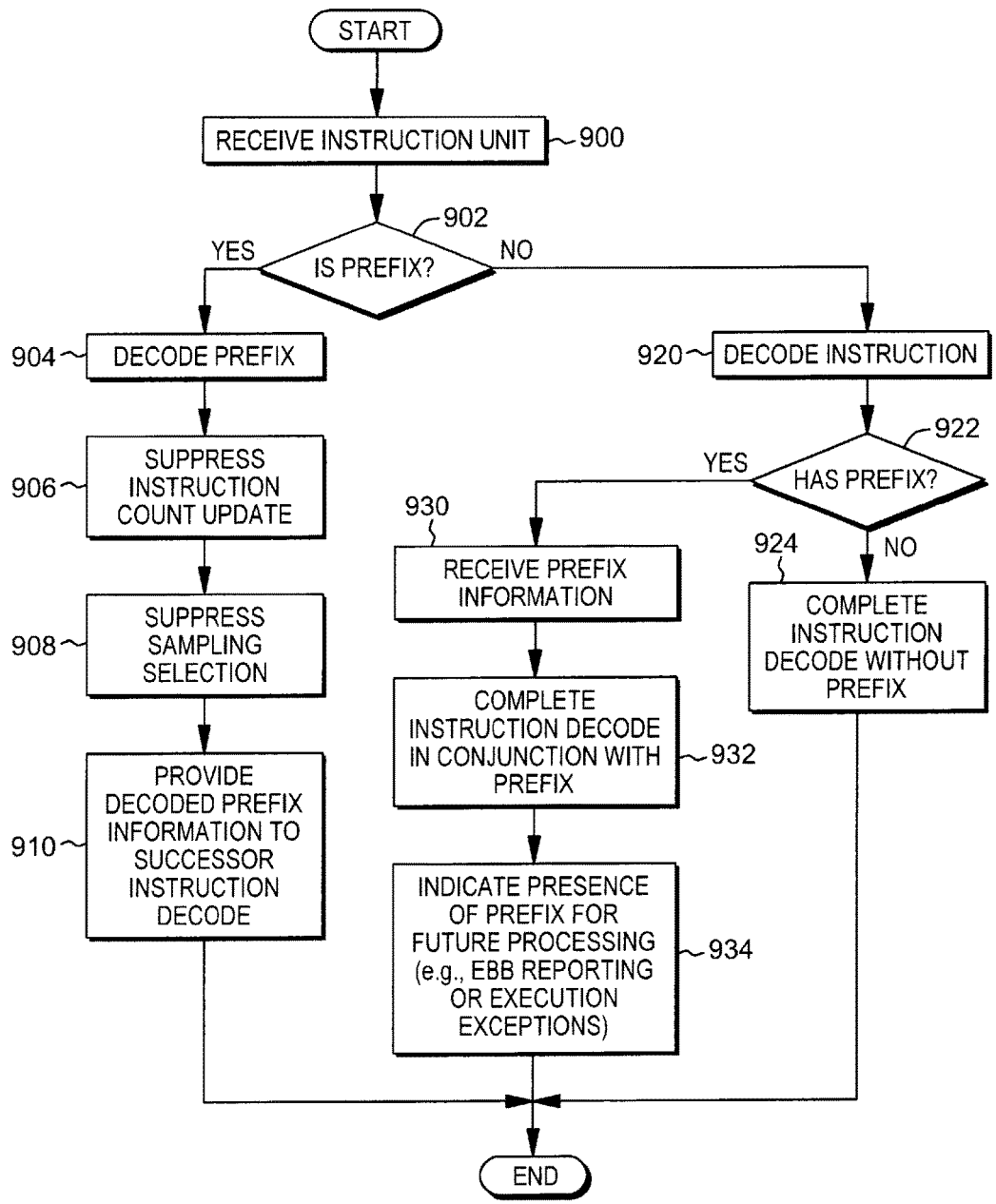
FIG. 9 depicts one example of logic associated with decoding instruction units, in accordance with one or more aspects of the present invention.

Further details relating to one embodiment of decoding an instruction unit by an instruction decode unit are described with reference to FIG. 9. Initially, an instruction unit is received by, for instance, an instruction decode unit, STEP 900. A determination is made as to whether the instruction is a prefix instruction, INQUIRY 902. If it is a prefix instruction, then the decode unit decodes the prefix, STEP 904. For instance, it identifies the components of the instruction (e.g., IA, imm16, limm3) to be used to modify a subsequent instruction, referred to as the prefixed instruction.

Further, in one embodiment, an instruction count update for the prefix instruction may be suppressed, STEP 906, as well as a sampling selection, STEP 908. The decoded prefix information is then provided to the next decoder unit, STEP 910.

Returning to INQUIRY 902, if the instruction is not a prefix instruction, then the instruction is decoded in a known manner, STEP 920. A determination is made by the decode unit as to whether the instruction has a prefix, INQUIRY 922. That is, is the instruction being decoded a prefixed instruction. If it is not a prefixed instruction, then the decoding is completed as is known, STEP 924.

However, if the instruction is a prefixed instruction, INQUIRY 922, then the prefix information is received, STEP 930, and the instruction decode is performed in conjunction with the prefix, STEP 932. For instance, an operand may be overridden and/or one or more operands may be extended. An indication is made as to the presence of the prefix for future processing, such as, for instance, event based branch reporting or execution exceptions, STEP 934.

Figure 10:
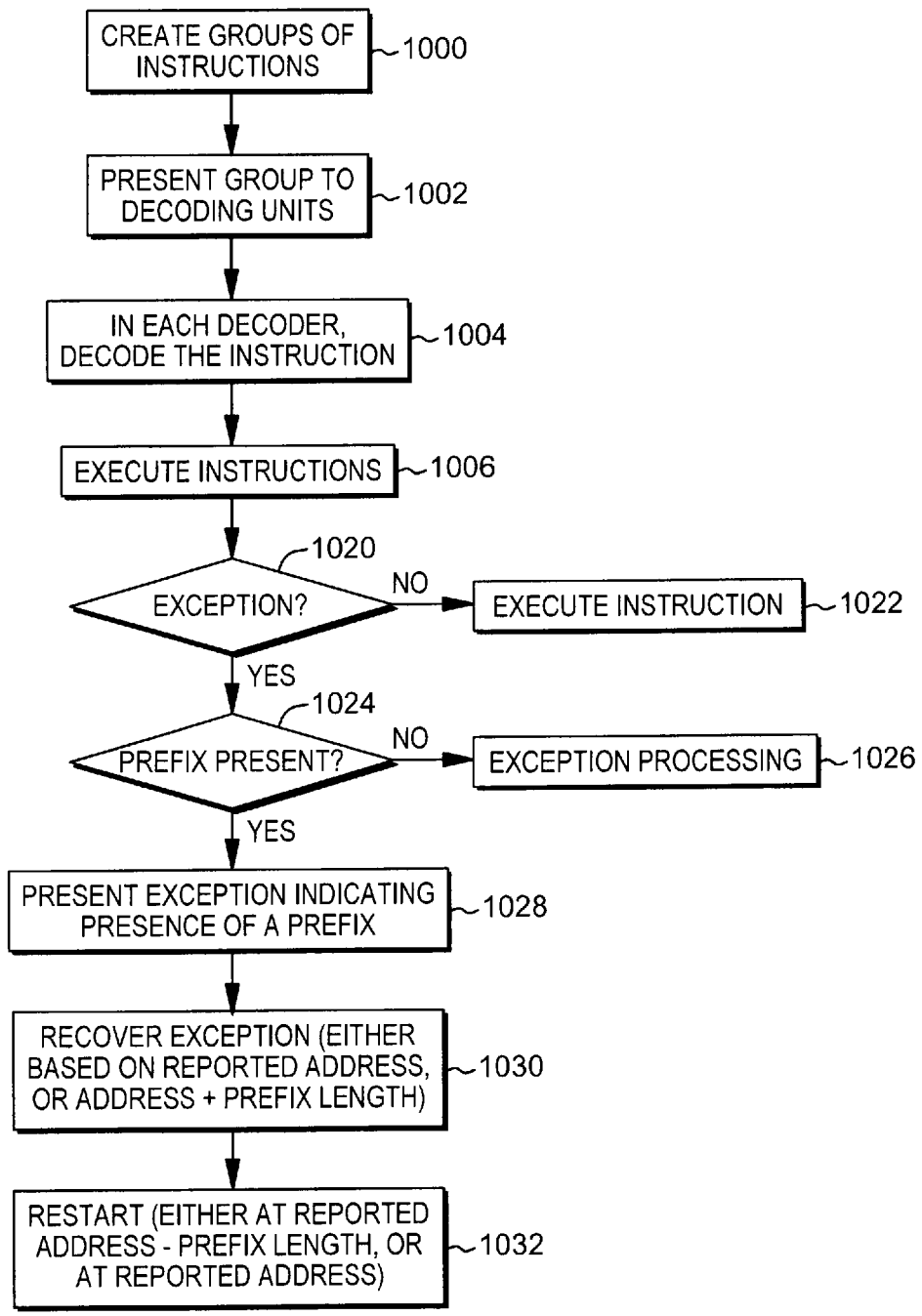
FIG. 10 depicts one example of prefix execution logic used in accordance with one or more aspects of the present invention.

One embodiment of handling certain exceptions when executing code with prefix instructions is described with reference to FIG. 10. Initially, a group of instructions is created for decoding, STEP 1000. For instance, a plurality of instruction units of an instruction stream are selected for decoding. The instruction units are forwarded to a corresponding number of instruction decode units in parallel, STEP 1002. The decoders decode the instructions, as described above, STEP 1004, and the decoded instructions are then executed, STEP 1006.

During execution, a determination is made as to whether there is an exception, INQUIRY 1020. For instance, has an exception been indicated by interrupt determination logic or otherwise. If there is no exception, then the instruction continues to execute until completion, STEP 1022. However, if an exception condition is detected (e.g., a page fault, floating point exception, other exceptions, etc.), a determination is made as to whether there is a prefix associated with the instruction encountering the exception, INQUIRY 1024. If there is no prefix, then conventional exception processing is performed, STEP 1026.

However, if a prefix is present, then, in one embodiment, the exception is presented with an indication of the presence of a prefix, STEP 1028. For example, in one embodiment, an exception is reported with an address of a prefixed instruction, in conjunction with a prefix indicator, and/or a prefix length indicator. In another embodiment, the address of the prefix is specified. Further, embodiments commonly include other information, e.g., such as, but not limited to, the cause for exception, the processor status word (PSW), the machine status register, and so forth. Control passes to, e.g., a software exception handler to recover the exception based on the reported information, STEP 1030. The exception handler processes the exception, depending on the exception type. In one particular example, a data page fault is processed. In accordance with processing the data page fault, a variety of conditions may be tested, and based on the tested exceptions, one or more of a page table entry update, a page-in operation, a new page allocation, or an error indication, including an abnormal end ("abend" or abort) of a program, may be performed. In other embodiments, the information obtained by the exception handler may be pre-processed and passed to a POSIX signal handler in accordance with one common operating system standard, or passed to an application for further processing. In accordance with another embodiment, the information may include one or more of an instruction prefix address, an instruction prefix indicator and/or an instruction prefix length indicator. Yet further, the processing of exception handler information via a signal or other application handling service may include the handling of floating point conditions, such as an inexact result, an overflow, or underflow exceptions. Yet other exception types may be processed using a variety of known processing concepts, and extended with code responsive to at least one or more of a prefix address, a prefix indicator, and a prefix length indicator. When an exception does not result in the termination of the application having caused an exception (e.g., via an "abend" when an application has attempted to access an inaccessible address), the instruction is then restarted either at the reported address minus the length of the prefix or at the reported address, STEP 1032. In at least one embodiment, the instruction may be restarted using a software emulation process, and hardware execution will resume with the nth instruction following the prefix and prefixed instruction having caused the exception. Again, although the prefix and prefixed instructions are independently received by separate decode units, the exception handling considers both instructions.

In a further embodiment, when a page fault or other synchronous exception to be taken between a prefix and a prefixed instruction occurs, an indicator is set in a control register. For example, the control register may be a state restoration register (SRR), and a bit may be allocated for this condition, e.g., SRR1[prefix]. In a further example, the exception may be indicated in a designated interruption area (e.g., at address 8C). Alternatively, if multiple prefixes of different lengths are possible, e.g., in accordance with a CISC (Complex Instruction Set Computing) architecture, a prefix length encoding prefixlLC, e.g., interruption_area@8C[prefixlLC] is present. Then, the system exception handler processes the exception in accordance with a known exception handling technique.

In one example of a designated interruption area:
140-143 (8C-8F hex) . . . Real Address
Program-Interruption Identification: During a program interruption, the instruction-length code is stored in bit positions 5 and 6 of location 141, and the interruption code is stored at locations 142-143. Zeros are stored at location 140 and in the remaining bit positions of location 141. The locations are locations within a particular register or area of memory.

Additionally, the exception handler may be expanded to correct for the restart address.

In the example of a RISC (Reduced Instruction Set Computing) architecture, the restart address may be adjusted by a fixed multiple of the RISC instruction size. In one embodiment, the adjustment may be performed by the software exception handler, e.g., either immediately upon receiving the exception notification, or immediately prior to finishing execution of the exception handler. In accordance with such an embodiment, the restart address obtained may be adjusted for the presence of a prefix with a code fragment such as:

If (SRR1[prefix]) SRR0=SRR0-4

In yet another embodiment, the correction may be performed at any other point in the exception handler.

In another aspect of exception processing in conjunction with prefix instructions, the restart address may be adjusted by custom logic, microcode, millicode, firmware, etc., prior to transferring control to a software interrupt handler, by modifying the reported restart address by initializing the SRR 0 register with a value corresponding to CIA-4, i.e., the current instruction address (CIA) of the prefixed instruction minus the length of a 4 byte RISC Power ISA instruction, in an example embodiment. In a CISC example embodiment, the restart address may be initialized to a current prefixed instruction's address minus the length of the prefix used in conjunction with the prefixed instruction.

In yet another embodiment, adjustment of the restart address may be performed in conjunction with the "return from exception" instruction, e.g., the RFID instruction in accordance with the Power ISA. Thus, in such an embodiment, when the RFID instruction is executed by the exception handler, the processor will adjust the restart address by the length of the prefix, if the presence of a prefix is indicated in the exception status, e.g., in an SRR register, and restart may occur, e.g., at SRR0-4 in an embodiment with 4 byte prefixes.

On the other hand, for a CISC architecture, the address received as the "old PSW address", i.e., the restart address in accordance with the z/Architecture, may be adjusted by the known fixed length of a prefix, if only one prefix length is supported:

if (designated_area_indicator of prefix is set)
oldPSW.address=oldPSW.address−known_CISCprefix_length;

where PSW is program status word. In accordance with one embodiment, this adjustment may be performed by a software exception handler function, e.g., immediately after exception handler entry, immediately prior to exception handler completion, or at any intervening point. In accordance with another embodiment, the reported old PSW address may be adjusted by custom logic, microcode, millicode, or firmware prior to passing control to an exception handler. In yet another embodiment, the adjustment may occur in conjunction with returning from an exception handler.

Alternatively, if multiple prefix lengths are supported, a length of the prefix is provided, and restart address adjustment may be performed, as follows:

if (designated_area_indicator of prefix is set)
oldPSW.address=oldPSW.address−decode (designated_interruption_area [prefixILC]);

In accordance with one embodiment, this adjustment may be performed by a software exception handler function, e.g., immediately after exception handler entry, immediately prior to exception handler completion, or at any intervening point. In accordance with another embodiment, the reported old PSW address may be adjusted by custom logic, microcode, millicode, or firmware prior to passing control to an exception handler. In yet another embodiment, the adjustment may occur in conjunction with returning from an exception handler.

Aspects of the present invention may be employed because prefixes are idempotent relative to execution, i.e., they themselves are not modifying state that is used in the ongoing execution of the program (other than modifying the execution of the next instruction, and causing the incrementing of the program counter and the accessing of the itext, etc.).

As described herein, an exception handling facility is provided that manages a prefix and prefixed instruction as one instruction even through they are received separately by different decoders. In one example, the prefix instruction is a same size as the prefixed instruction.

In accordance with one or more aspects of the present invention, if an instruction fault occurs between the prefix and the prefixed instruction (e.g., the prefix is the last instruction unit on a page, and the prefixed instruction is the first instruction on a paged out page), special handling is employed.

In one embodiment, an instruction page fault is indicated, the fault is indicated at the instruction address "faulted_a" and the presence (and/or length) of a prefix is indicated to cause the restart at faulted_a-prefix_length.

In another embodiment, an instruction fault is indicated at the address of the prefix, and supervisor software (e.g., operating system (OS), hypervisor, virtual machine system, firmware, etc.) is enabled to recognize to page in the next page.

In yet another embodiment, the fault is indicated at the prefix address "prefix_a" and the presence (and/or length) of a prefix is indicated to supervisor software (OS, hypervisor, virtual machine system, firmware, etc.) to recognize to page in the page at prefix_a+prefix_length.

Figure 11B:
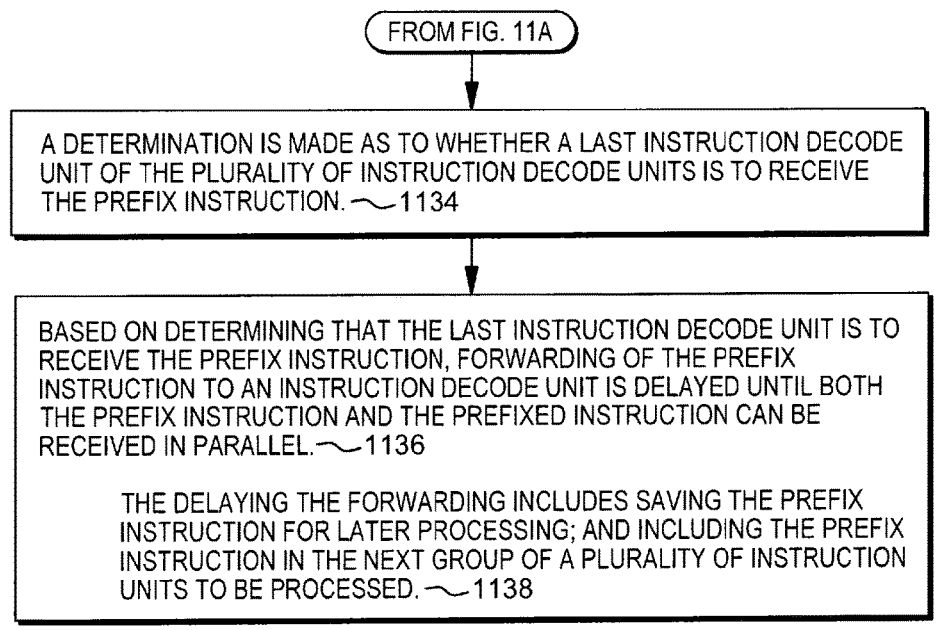

One embodiment of processing associated with handling exception conditions in code with prefix instructions is described with reference to FIGS. 11A-11B. Referring to FIG. 11A, a plurality of instruction units of an instruction stream are selected to be received in parallel by a plurality of instruction decode units of a processor, STEP 1100. The plurality of instruction units includes a prefix instruction and a prefixed instruction, STEP 1102. The prefixed instruction is an instruction to be modified by the prefix instruction. As examples, the prefix instruction and the prefixed instruction are the same size, and the size of the instruction units is defined by the instruction set architecture (ISA) of the processor (1104).

An exception condition associated with the prefixed instruction is determined, STEP 1106. For instance, a determination is made of an instruction fault between the prefix and prefixed instructions, STEP 1108. In a further example, the exception condition is determined during execution of the prefixed instruction, STEP 1110.

In one embodiment, exception handling for the prefixed instruction is performed, STEP 1114. This includes, for instance, determining an address at which to restart execution of the instruction stream, in which the determining address includes adjusting the address at which to restart execution based on the prefix instruction to be separately received by an instruction decode unit, STEP 1116. As one particular example, the adjusting the address includes subtracting a length of the prefix instruction from an address of the prefixed instruction to obtain an adjusted address at which to restart execution, STEP 1120.

In further embodiments, the performing the exception handling includes presenting an indication of the exception condition and presence of the prefix instruction, STEP 1122; and/or recovering from the exception condition using a reported address of the exception condition or a reported address of the exception condition adjusted by a length of the prefix instruction, STEP 1124. Other variations are possible.

In yet a further embodiment, a determination is made as to whether a last instruction decode unit of the plurality of instruction decode units is to receive the prefix instruction, STEP 1134 (FIG. 11B). Based on determining that the last instruction decode unit is to receive the prefix instruction, the forwarding of the prefix instruction to an instruction decode unit is delayed until both the prefix instruction and the prefixed instruction may be received in parallel, STEP 1136. The delaying the forwarding includes saving the prefix instruction for later processing, and including the prefix instruction in a next group of a plurality of instruction units to be processed, STEP 1138.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
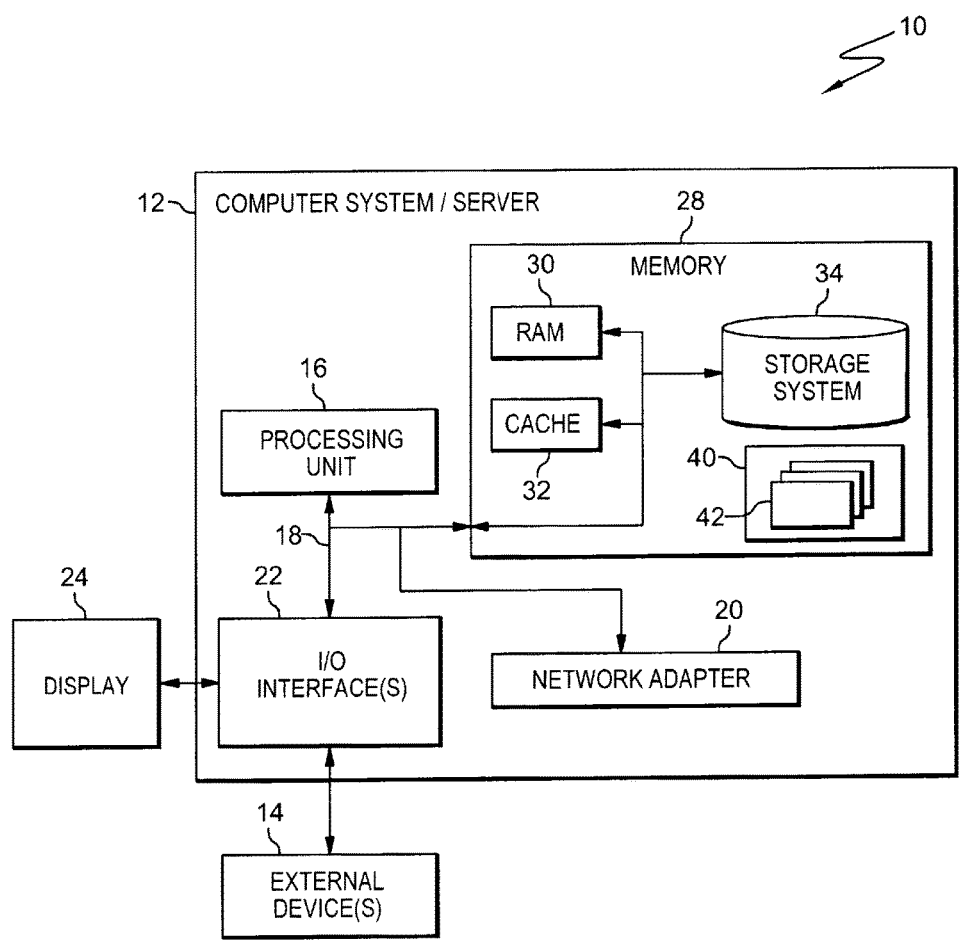
FIG. 12 depicts one embodiment of a cloud computing node.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
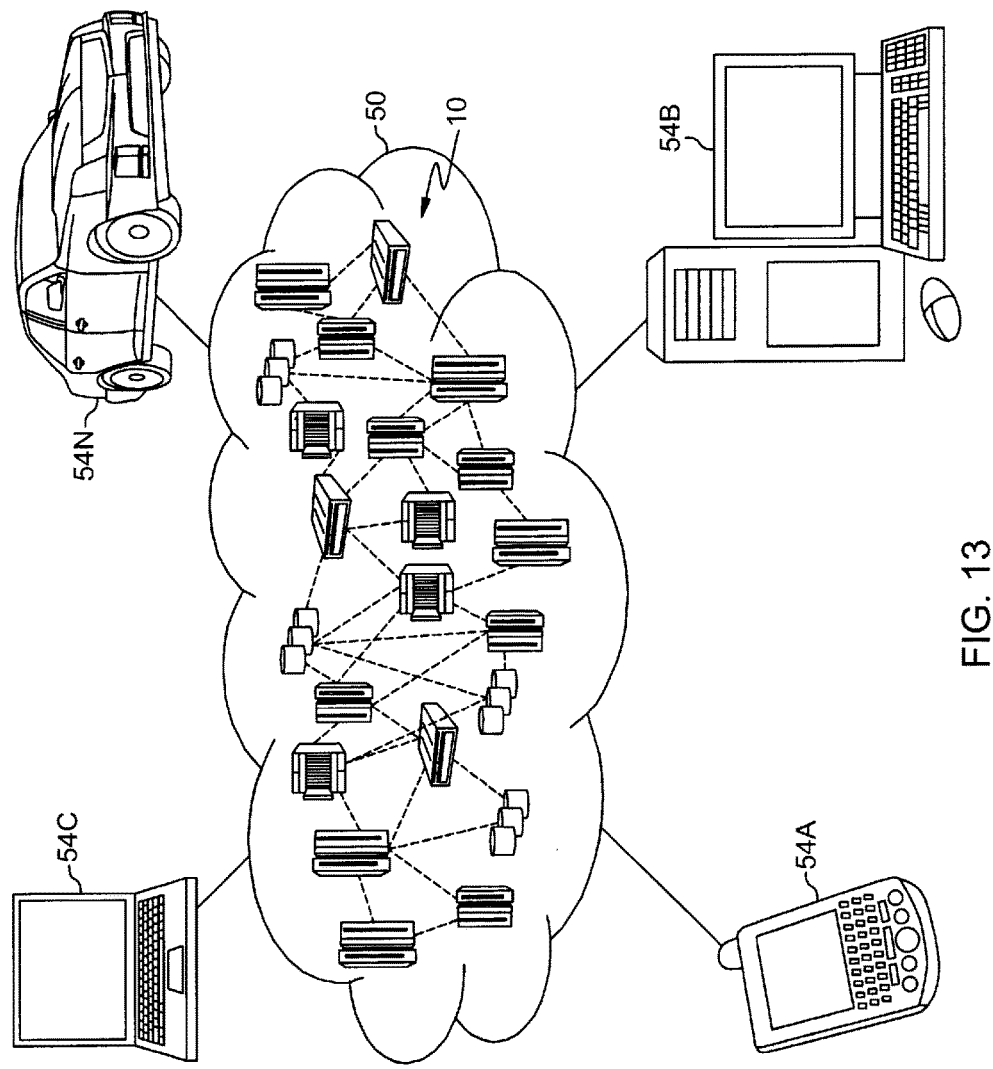
FIG. 13 depicts one embodiment of a cloud computing environment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
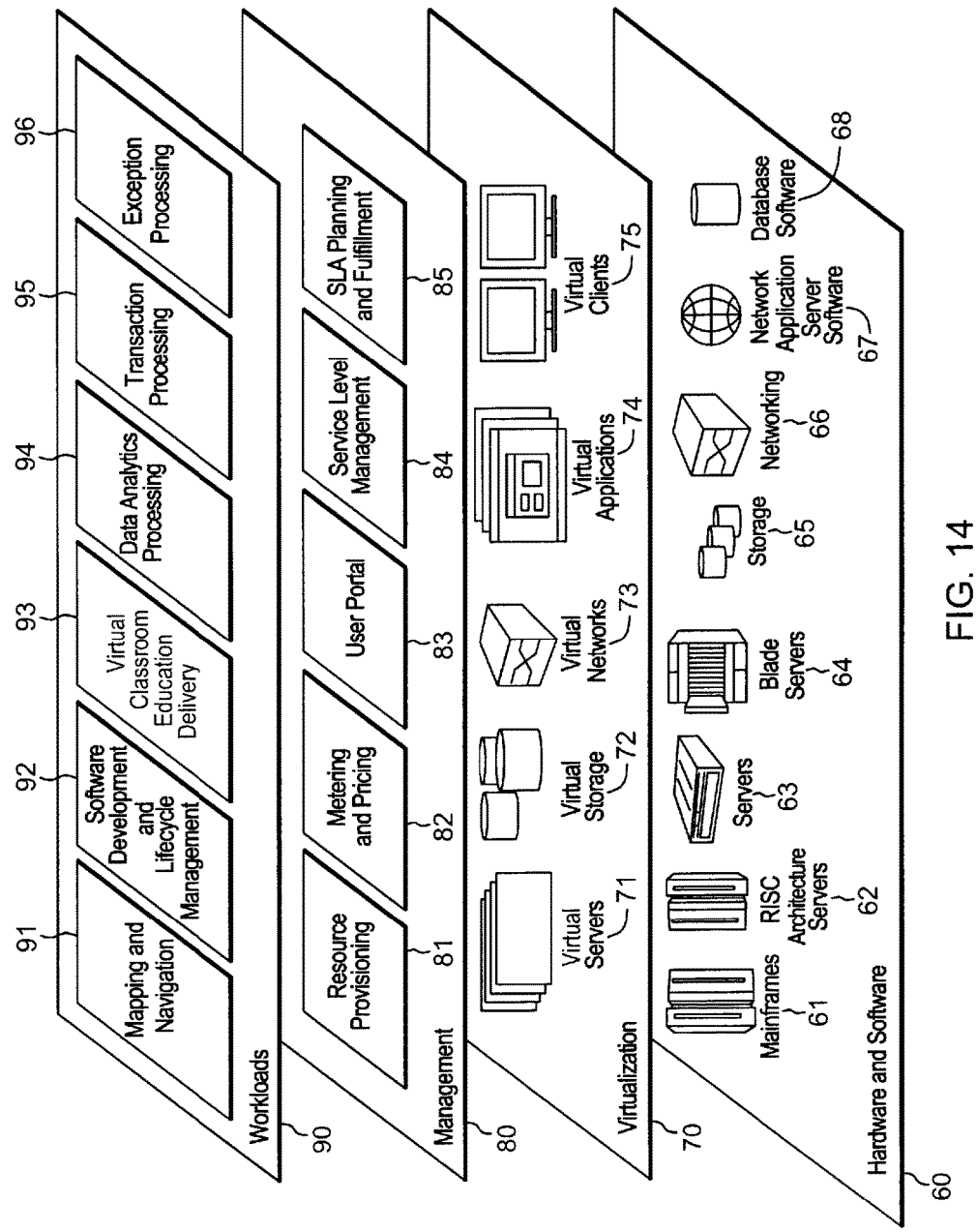
FIG. 14 depicts one example of abstraction model layers.

Referring now to FIG. 14, a set of functional abstraction layers provided by cloud computing environment 50 (FIG. 13) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and exception handling processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing exception conditions, the computer program product comprising:
   a non-transitory computer readable storage medium readable by a processing circuit and storing instructions for execution by the processing circuit for performing a method comprising:
      selecting a plurality of instruction units of an instruction stream to be received in parallel by a plurality of instruction decode units of a processor, wherein the plurality of instruction units includes a prefix instruction and a prefixed instruction, the prefix instruction being an instruction to modify the prefixed instruction and to be forwarded from one decode unit of the plurality of instruction decode units to another decode unit of the plurality of instruction decode units that includes the prefixed instruction to decode the prefix instruction and the prefixed instruction together;
      determining an exception condition associated with the prefixed instruction; and
      performing exception handling for the prefixed instruction, wherein the performing comprises determining an address at which to restart execution of the instruction stream, wherein the determining the address comprises adjusting the address at which to restart execution based on the prefix instruction to be separately received by an instruction decode unit, wherein the prefix instruction and the prefixed instruction, which are separate instructions to be independently received by the plurality of instruction decode units in parallel, are to be decoded by the other decode unit, and have a dependent relationship with one another in, at least, handling the exception condition, are considered in the performing exception handling.

2. The computer program product of claim 1, wherein the determining the exception condition includes determining that an instruction fault exists between the prefix instruction and the prefixed instruction to be separately received.

3. The computer program product of claim 1, wherein the adjusting the address comprises subtracting a length of the prefix instruction from an address of the prefixed instruction to obtain an adjusted address at which to restart execution.

4. The computer program product of claim 1, wherein the performing exception handling comprises presenting an indication of the exception condition and presence of the prefix instruction.

5. The computer program product of claim 1, wherein the performing exception handling comprises recovering from the exception condition using one of a reported address of the exception condition or a reported address of the exception condition adjusted by a length of the prefix instruction.

6. The computer program product of claim 1, wherein the exception condition occurs during execution of the prefixed instruction.

7. The computer program product of claim 1, wherein the method further comprises:
   determining whether a last instruction decode unit of the plurality of instruction decode units is to receive the prefix instruction; and
   based on determining that the last instruction decode unit is to receive the prefix instruction, delaying forwarding the prefix instruction to an instruction decode unit until both the prefix instruction and the prefixed instruction are to be received in parallel.

8. The computer program product of claim 7, wherein the delaying forwarding includes:
   saving the prefix instruction for later processing; and
   including the prefix instruction in a next group of a plurality of instruction units to be processed.

9. The computer program product of claim 1, wherein the prefix instruction is a same size as the prefixed instruction.

10. The computer program product of claim 1, wherein the method further comprises:
   obtaining, by the plurality of instruction decode units in parallel, the plurality of instruction units;
   determining by the one decode unit that the prefix instruction has been obtained by the one decode unit; and
   forwarding the prefix instruction to the other decode unit, based on determining the one decode unit has obtained the prefix instruction.

11. A computer system for managing exception conditions, the computer system comprising:
   a memory; and
   a processor in communication with the memory, wherein the computer system is configured to perform a method, said method comprising:
      selecting a plurality of instruction units of an instruction stream to be received in parallel by a plurality of instruction decode units, wherein the plurality of instruction units includes a prefix instruction and a prefixed instruction, the prefix instruction being an instruction to modify the prefixed instruction and to be forwarded from one decode unit of the plurality of instruction decode units to another decode unit of the plurality of instruction decode units that includes the prefixed instruction to decode the prefix instruction and the prefixed instruction together;

determining an exception condition associated with the prefixed instruction; and performing exception handling for the prefixed instruction, wherein the performing comprises determining an address at which to restart execution of the instruction stream, wherein the determining the address comprises adjusting the address at which to restart execution based on the prefix instruction to be separately received by an instruction decode unit, wherein the prefix instruction and the prefixed instruction, which are separate instructions to be independently received by the plurality of instruction decode units in parallel, are to be decoded by the other decode unit, and have a dependent relationship with one another in, at least, handling the exception condition, are considered in the performing exception handling.

12. The computer system of claim 11, wherein the determining the exception condition includes determining that an instruction fault exists between the prefix instruction and the prefixed instruction to be separately received.

13. The computer system of claim 11, wherein the adjusting the address comprises subtracting a length of the prefix instruction from an address of the prefixed instruction to obtain an adjusted address at which to restart execution.

14. The computer system of claim 11, wherein the performing exception handling comprises presenting an indication of the exception condition and presence of the prefix instruction.

15. The computer system of claim 11, wherein the performing exception handling comprises recovering from the exception condition using one of a reported address of the exception condition or a reported address of the exception condition adjusted by a length of the prefix instruction.

16. The computer system of claim 11, wherein the exception condition occurs during execution of the prefixed instruction.

17. The computer system of claim 11, wherein the method further comprises:

determining whether a last instruction decode unit of the plurality of instruction decode units is to receive the prefix instruction; and based on determining that the last instruction decode unit is to receive the prefix instruction, delaying forwarding the prefix instruction to an instruction decode unit until both the prefix instruction and the prefixed instruction are to be received in parallel.

18. The computer system of claim 17, wherein the delaying forwarding includes:

saving the prefix instruction for later processing; and including the prefix instruction in a next group of a plurality of instruction units to be processed.

19. The computer system of claim 11, wherein the prefix instruction is a same size as the prefixed instruction.

20. The computer system of claim 11, wherein a size of an instruction unit is defined by an instruction set architecture of an architecture of the processor.

* * * * *